(12) United States Patent
Deng et al.

(10) Patent No.: US 11,203,319 B2
(45) Date of Patent: Dec. 21, 2021

(54) AIRBAG INFLATION RESTRAINT WITH RELEASABLE EXTENSION

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 29 days.

(21) Appl. No.: 16/741,845

(22) Filed: Jan. 14, 2020

(65) Prior Publication Data
US 2021/0213903 A1 Jul. 15, 2021

(51) Int. Cl.
  *B60R 21/207* (2006.01)
  *B60R 21/2338* (2011.01)
  *B60R 21/231* (2011.01)
  *B60R 21/16* (2006.01)

(52) U.S. Cl.
  CPC ........ *B60R 21/207* (2013.01); *B60R 21/2338* (2013.01); *B60R 2021/161* (2013.01); *B60R 2021/23146* (2013.01)

(58) Field of Classification Search
  CPC .............. B60R 21/207; B60R 21/2338; B60R 2021/161; B60R 2021/23146
  See application file for complete search history.

(56) References Cited

U.S. PATENT DOCUMENTS

| | | | |
|---|---|---|---|
| 5,308,113 A | 5/1994 | Moriset | |
| 5,489,119 A | 2/1996 | Prescaro et al. | |
| 5,997,037 A | 12/1999 | Hill et al. | |
| 6,997,473 B2 | 2/2006 | Tanase et al. | |
| 7,093,854 B2 | 8/2006 | Fischer et al. | |
| 7,441,805 B2 | 10/2008 | Jamison et al. | |
| 9,010,804 B2* | 4/2015 | Witt, Jr. .............. | B60R 21/2171 |
| | | | 280/743.2 |
| 9,139,153 B2 | 9/2015 | Deng et al. | |
| 9,199,602 B1 | 12/2015 | Fischer et al. | |
| 9,517,747 B2 | 12/2016 | Hotta et al. | |
| 9,738,243 B2* | 8/2017 | Fukawatase ........ | B60R 21/2338 |
| 10,118,581 B2* | 11/2018 | Wiik ................. | B60R 21/23138 |
| 10,131,312 B2 | 11/2018 | Wiik et al. | |

(Continued)

FOREIGN PATENT DOCUMENTS

| | | |
|---|---|---|
| JP | 2004276808 A | 10/2004 |
| JP | 2010116134 A | 5/2010 |
| KR | 1020130008338 A | 1/2013 |

*Primary Examiner* — Darlene P Condra
(74) *Attorney, Agent, or Firm* — Frank A. MacKenzie; Bejin Bieneman PLC

(57) ABSTRACT

An assembly for a vehicle includes an airbag inflatable to an inflated position. The airbag includes a first panel, a second panel, and an inflation chamber between the first panel and the second panel. The assembly includes an inflation restraint exterior to the inflation chamber. The inflation restraint includes a first end fixed to the first panel and a second end fixed to the second panel. The inflation restraint includes a releasable extension between the first end and the second end. The releasable extension is movable from an unreleased position to a released position as the airbag inflates to the inflated position.

20 Claims, 13 Drawing Sheets

(56) References Cited

U.S. PATENT DOCUMENTS

| | | |
|---|---|---|
| 10,173,631 B2 | 1/2019 | Perez Garcia et al. |
| 10,246,041 B2 | 4/2019 | Kobayashi et al. |
| 10,300,878 B2 | 5/2019 | Park et al. |
| 2003/0116951 A1* | 6/2003 | Igawa ............... B60R 21/2338 280/743.1 |
| 2004/0212187 A1* | 10/2004 | Kai ................... B60R 21/2338 280/743.2 |
| 2005/0206138 A1* | 9/2005 | Breuninger ........... B60R 21/231 280/729 |
| 2006/0022439 A1* | 2/2006 | Bayley ............. B60R 21/23138 280/729 |
| 2006/0131847 A1* | 6/2006 | Sato ................. B60R 21/23138 280/730.2 |
| 2006/0249943 A1* | 11/2006 | Bauer ................... B60R 21/231 280/743.2 |
| 2010/0019473 A1* | 1/2010 | Dennis ............... B60R 21/2338 280/729 |
| 2011/0049852 A1* | 3/2011 | Kibat ............... B60R 21/23138 280/743.2 |
| 2011/0309605 A1* | 12/2011 | Kumagai ............. B60R 21/239 280/741 |
| 2012/0091697 A1* | 4/2012 | Wiik ................ B60R 21/23138 280/730.2 |
| 2013/0147171 A1* | 6/2013 | Shin ................... B60R 21/2338 280/743.2 |
| 2014/0062069 A1* | 3/2014 | Fukawatase ......... B60R 21/207 280/730.2 |
| 2015/0321636 A1* | 11/2015 | Jang ..................... B60R 21/235 280/743.2 |
| 2016/0311392 A1* | 10/2016 | Jindal .............. B60R 21/01512 |
| 2017/0334390 A1* | 11/2017 | Song ................ B60R 21/23138 |
| 2018/0043852 A1* | 2/2018 | Fischer ................ B60R 21/233 |
| 2018/0290619 A1* | 10/2018 | Kitagawa ............. B60R 21/207 |
| 2018/0326938 A1* | 11/2018 | Rickenbach ......... B60R 21/233 |
| 2019/0061676 A1* | 2/2019 | Kwon .................. B60R 21/233 |
| 2019/0077356 A1* | 3/2019 | Patel .................... B60R 21/231 |
| 2019/0161053 A1* | 5/2019 | Gwon ...................... B60N 2/64 |
| 2019/0366970 A1* | 12/2019 | Wiscombe ........ B60R 21/23138 |
| 2020/0017061 A1* | 1/2020 | Rutgersson ........... B60R 21/233 |
| 2020/0324725 A1* | 10/2020 | Jindal .................. B60R 21/201 |

* cited by examiner

AIRBAG INFLATION RESTRAINT WITH RELEASABLE EXTENSION

BACKGROUND

A side airbag is mounted to a seatback and is inflatable along a side of an occupant, specifically along the torso and/or hip of the occupant. The side airbag, for example, may be inflatable between the occupant and a vehicle door. In another example, the side airbag may be inflatable between the occupant and a middle console adjacent the seatback or between the occupant and an adjacent occupant. The side airbag controls the kinematics of the occupant in vehicle impacts that urge the occupant in a cross-vehicle direction, e.g., a side impact.

DETAILED DESCRIPTION

Figure 1:
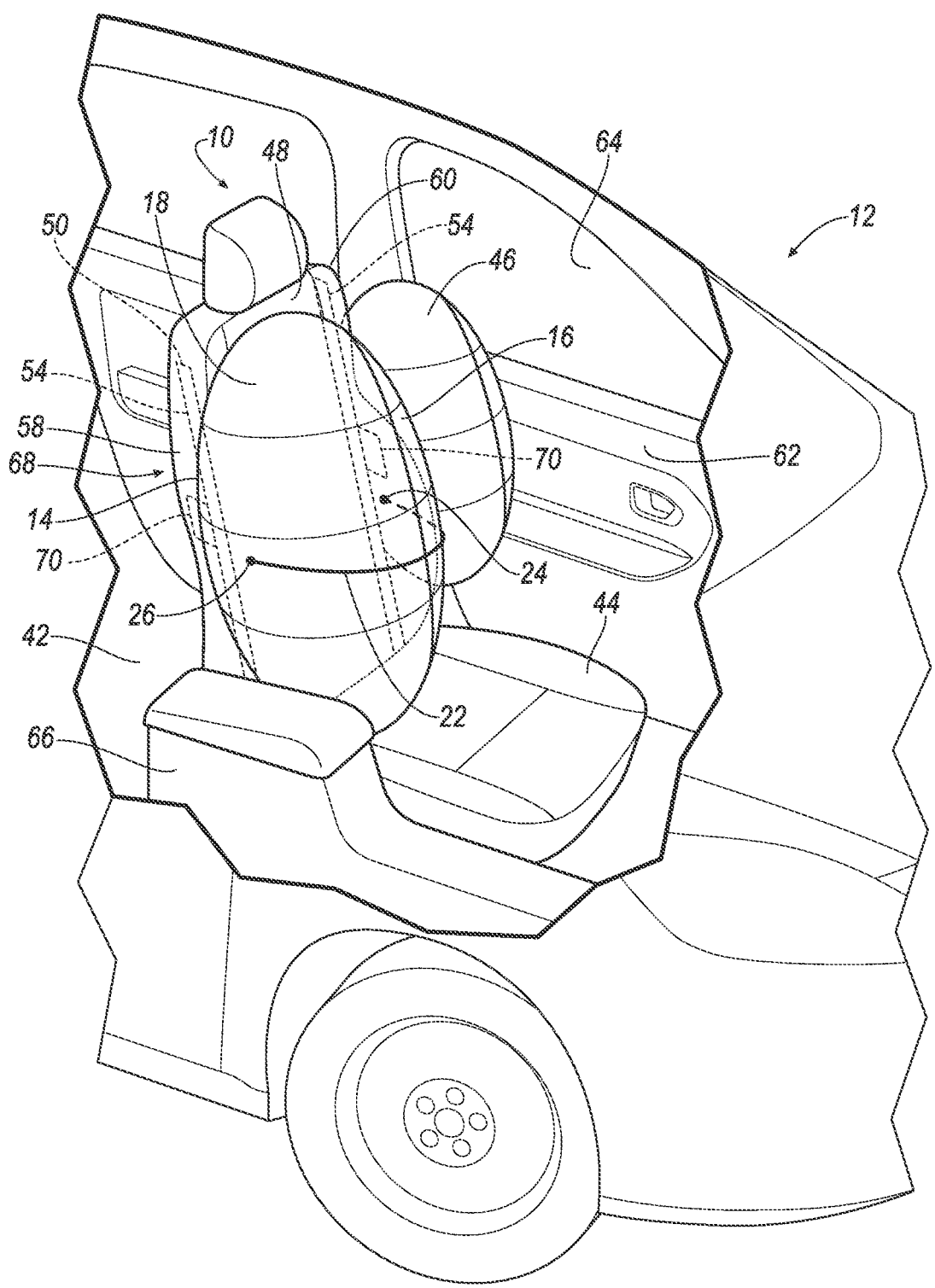
FIG. 1 is cut-away view of a vehicle having an airbag between a seat and a middle console and a second airbag between the seat and a door of the vehicle.

An assembly includes an airbag inflatable to an inflated position, the airbag having a first panel, a second panel, and an inflation chamber between the first panel and the second panel. The assembly includes an inflation restraint exterior to the inflation chamber, the inflation restraint having a first end fixed to the first panel and a second end fixed to the second panel. The inflation restraint includes a releasable extension between the first end and the second end, the releasable extension is movable from an unreleased position to a released position as the airbag inflates to the inflated position.

The inflation restraint may maintain the first end and the second end spaced from each other by a first distance in the unreleased position and the first end and the second end are spaced from each other a second distance greater than the first distance in the released position.

The releasable extension may include a releasable knot between the first end and the second end.

The inflation restraint may extend continuously from the first end to the second end in the released position.

The inflation restraint may include a first elongated portion extending from the releasable knot to the first end and a second elongated portion extending from the releasable knot to the second end.

The first elongated portion may be unattached to the airbag from the releasable knot to the first end and the second elongated portion is unattached from the airbag from the releasable knot to the second end.

The releasable knot may be unattached from the airbag.

The releasable knot may be unattached from the airbag.

The releasable knot may include a loop.

The releasable extension may include a first strip extending from the first end, a second strip extending from the second end, and a row of lands and perforations in alternating relationship between the first strip and the second strip, the lands being frangible relative to the first strip and/or second strip.

The assembly may include a second inflation restraint being releasable in a direction opposite of the inflation restraint.

The inflation restraint and the second inflation restraint each may include a first strip, a second strip, and a row of lands and perforations in alternating relationship between the first strip and the second strip, the lands being frangible relative to the first strip and/or second strip.

The airbag may include a head portion, a pelvic portion, and a thoracic portion between the head portion and the pelvic portion, the releasable extension being positioned at the thoracic portion.

An assembly includes a seatback and an airbag inflatable to an inflated position and supported by the seatback. The airbag has a first panel, a second panel, and an inflation chamber between the first panel and the second panel. The airbag includes an inflation restraint exterior to the inflation chamber, the restraint having a first end fixed to the first panel and a second end fixed to the second panel. The inflation restraint includes a releasable extension between the first end and the second end, the releasable extension is movable from an unreleased position to a released position as the airbag inflates to the inflated position.

The releasable extension may maintain the first end and the second end spaced from each other by a first distance in the unreleased position and the first end and the second end are spaced from each other a second distance greater than the first distance in the released position.

The releasable extension may include a releasable knot between the first end and the second end.

The releasable extension may include a first strip extending from the first end, a second strip extending from the second end, and a row of lands and perforations in alternating relationship between the first strip and the second strip, the lands being frangible relative to the first strip and second strip.

The seatback may include an inboard side and outboard side spaced from the inboard side, the airbag supported by the inboard side of the seatback.

The assembly may include a second airbag supported by the outboard side of the seatback.

The assembly may include a middle console, the airbag being inflatable between the seatback and the middle console.

With reference to the Figures, wherein like numerals indicate like parts throughout the several views, an assembly 10 for a vehicle 12 includes an airbag 14 inflatable to an inflated position. The airbag 14 includes a first panel 16, a second panel 18, and an inflation chamber 20 between the first panel 16 and the second panel 18. The assembly 10 includes an inflation restraint 22 exterior to the inflation chamber 20. The inflation restraint 22 includes a first end 24 fixed to the first panel 16 and a second end 26 fixed to the second panel 18. The inflation restraint 22 includes a releasable extension 28 between the first end 24 and the second end 26. The releasable extension 28 is movable from an unreleased position to a released position as the airbag 14 inflates to the inflated position.

The inflation restraint 22 temporarily restrains inflation of a portion of the airbag 14 relative to the rest of the airbag 14. As the airbag 14 inflates, the releasable extension 28 releases to the released position allowing the airbag 14 to further inflate. The temporary restraint of the airbag 14 during inflation controls the shape of the airbag 14 and the shape of the airbag 14 controls the kinematics of the occupant during inflation of the airbag 14. The airbag 14 changes shape as the airbag 14 inflates and, when fully inflated, the shape of the airbag 14 controls the kinematics of the occupant.

One embodiment of the assembly 10 is shown in FIGS. 3A-3C, 4, and 5A-5B in which the releasable extension 28 is a releasable knot 30. As the airbag 14 inflates to the inflated position, the knot releases to the released position to allow the airbag 14 to further expand. Another embodiment of the assembly 10 show in FIGS. 6A-6C, 7, 8A-8B, and 9 in which the releasable extension 28 is a tear strip 32 including a first strip 34, a second strip 36, and row of lands 38 and perforations 40 between the first strip 34 and the second strip 36. As the airbag 14 inflates, the lands 38 of the releasable extension 28 break to release the first strip 34 relative to the second strip 36 to the released position and allow the airbag 14 to further inflate. Common numerals are used to identify common features in the example embodiments.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 may define a passenger cabin 42 to house occupants, if any, of the vehicle 12. The passenger cabin 42 may extend across the vehicle 12, i.e., from one side to the other side of the vehicle 12. The passenger cabin 42 includes a front end and a rear end with the front end being in front of the rear end during forward movement of the vehicle 12.

Figure 2:
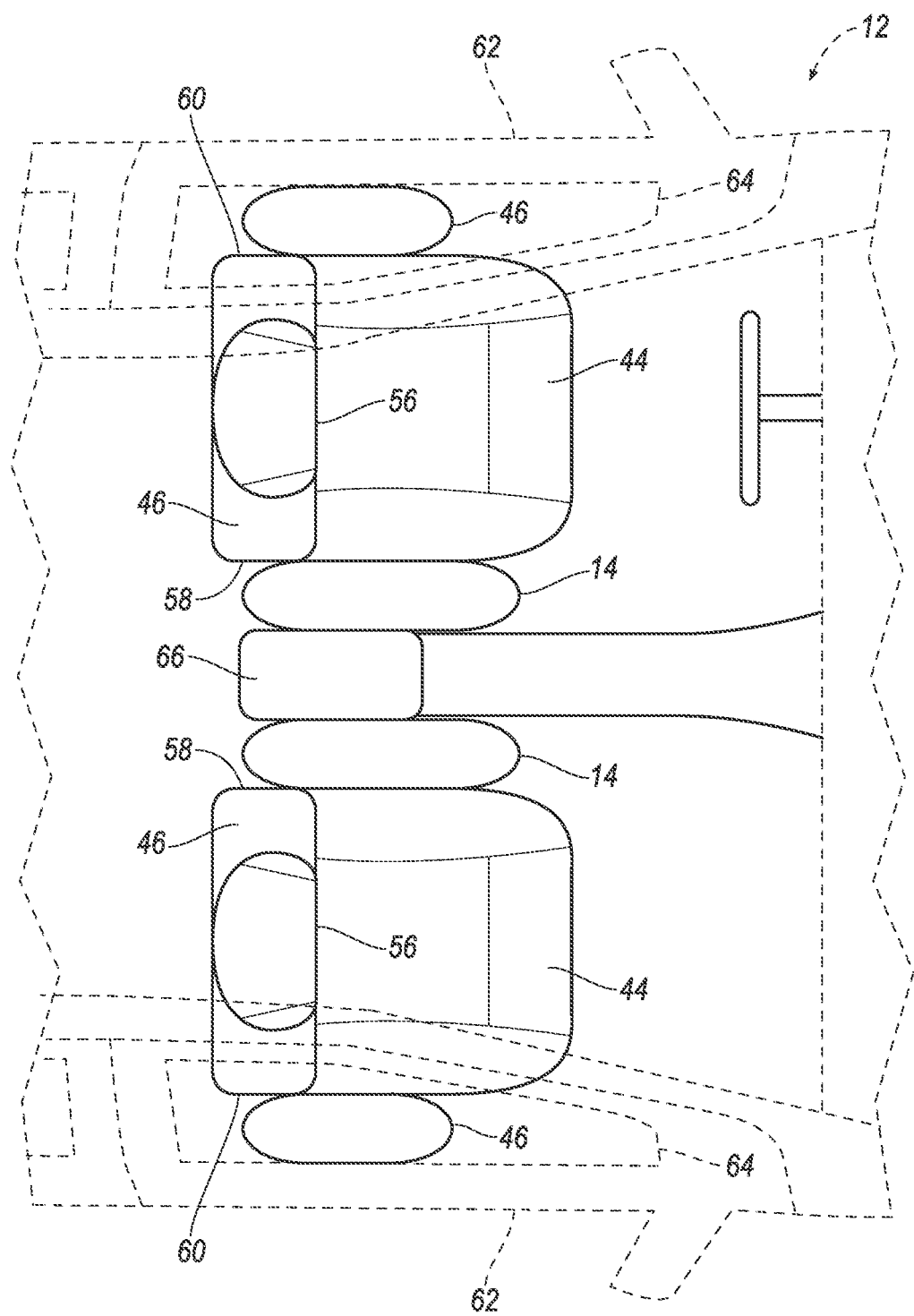
FIG. 2 is a top view of the vehicle showing the airbag between the seat and the middle console and the second airbag between the seat and the door.
Figure 3A:
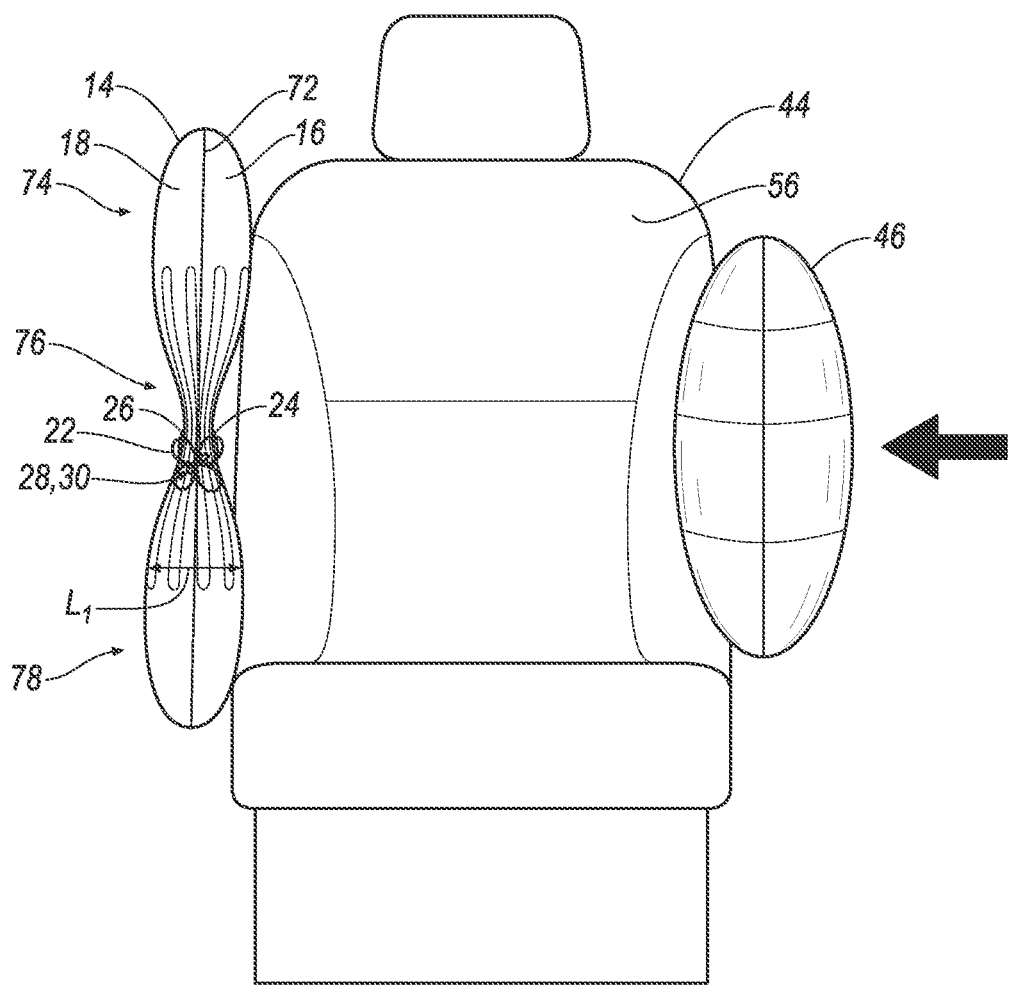
FIG. 3A is a front view of a first embodiment of the airbag having an inflation restraint including a releasable knot in an unreleased position.
Figure 3B:
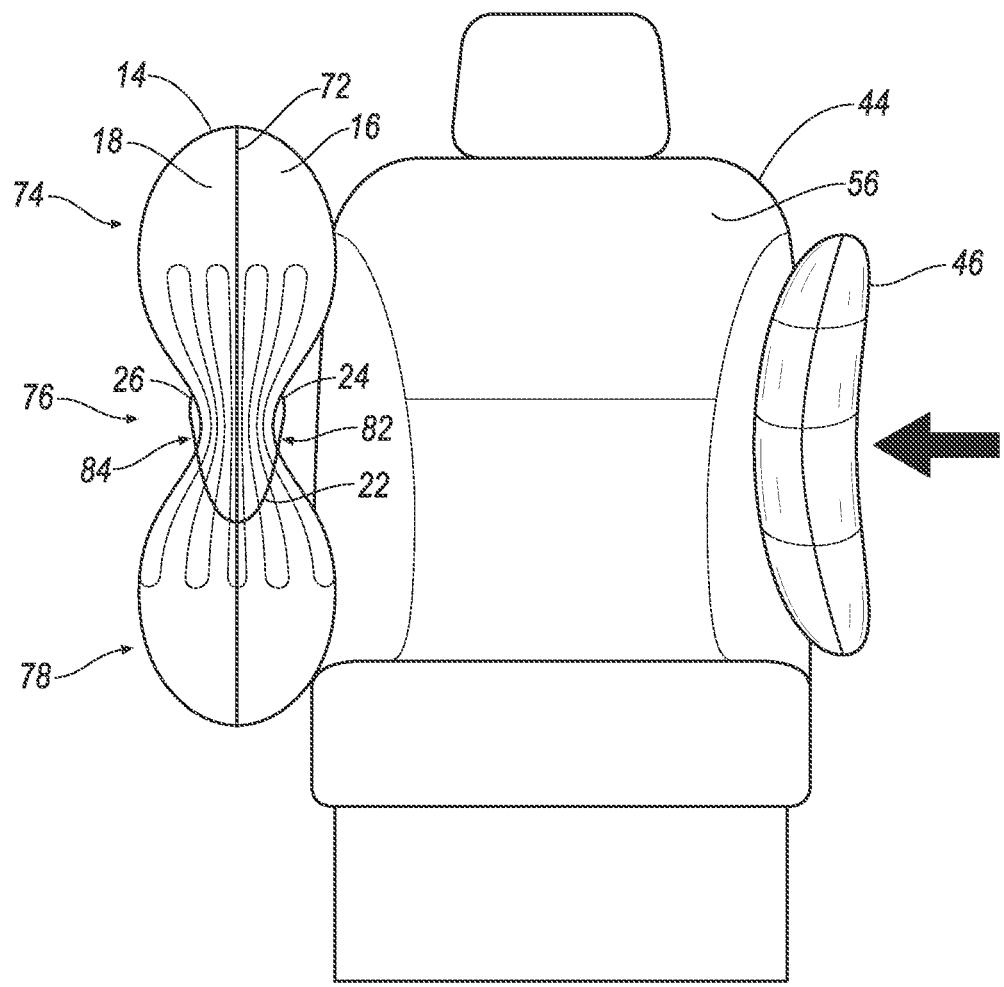
FIG. 3B is a front view of the first embodiment of the airbag having the inflation restraint including the releasable knot in a released position during inflation of the airbag.
Figure 3C:
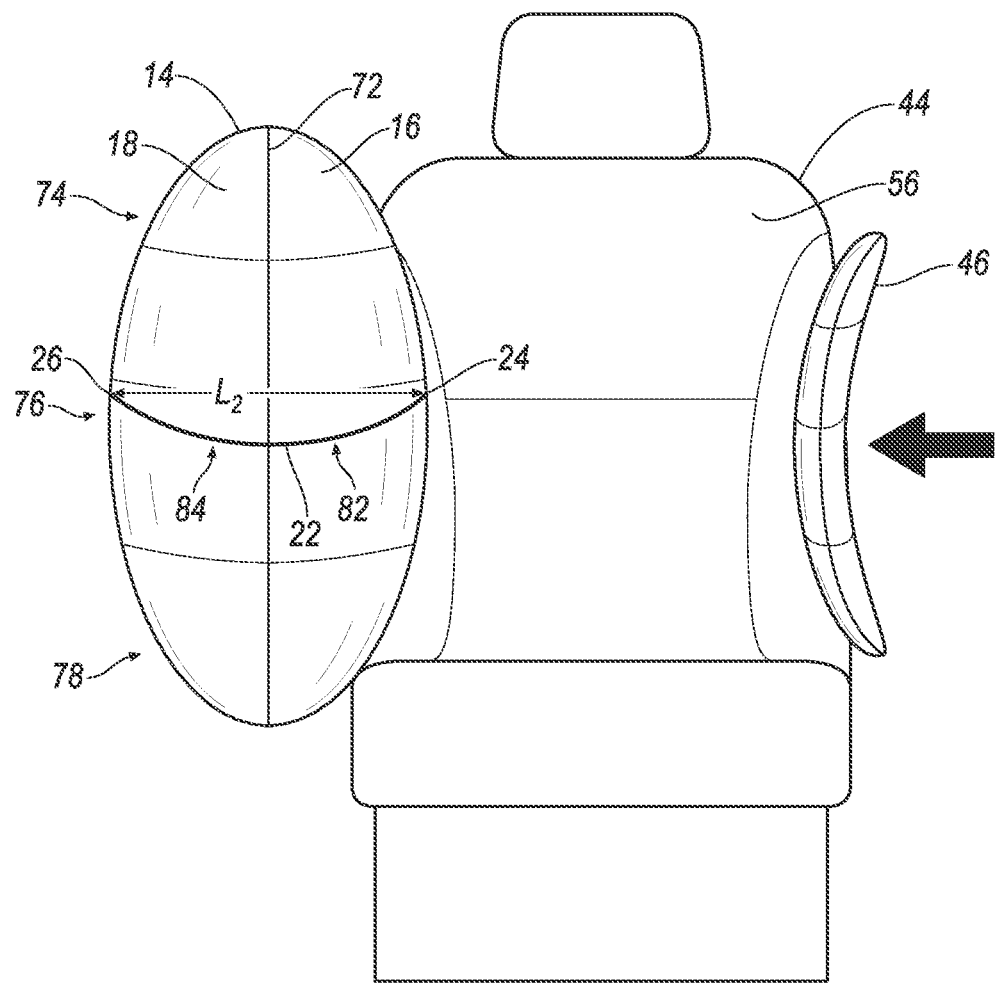
FIG. 3C is a front view of the first embodiment of the airbag in an inflated position after release of the releasable knot to the released position.

As shown in FIGS. 1 and 2, the vehicle 12 may include one or more seats 44 disposed in the passenger cabin 42. The seat 44 may be a front seat, i.e., forward-most and near the front end. The example shown in FIG. 2 includes two front seats, e.g., a driver seat and a passenger. More than one seat 44 may support one airbag 14, e.g., in the example in FIG. 2, the front seats each support one airbag 14. As described further below, each of the front seats may also include a second airbag 46.

Each seat 44 includes a seatback 48 and a seat bottom (not numbered). The seatback 48 may be supported by the seat bottom and may be stationary or movable relative to the seat bottom. The seatback 48 and the seat bottom may be adjustable in multiple degrees of freedom. Specifically, the seatback 48 and the seat bottom may themselves be adjustable, in other words, adjustable components within the seatback 48 and/or the seat bottom, and/or may be adjustable relative to each other.

The seatback 48 may include a seatback frame 50 and a covering 52 supported on the seatback frame 50. The seatback frame 50 may include tubes, beams, etc. Specifically, the seatback frame 50 includes a pair of upright frame members 54. The upright frame members 54 are elongated, and specifically, are elongated in a generally upright direction when the seatback 48 is in a generally upright position. The upright frame members 54 are spaced from each other and the seatback frame 50 includes cross-members (not shown) extending between the upright frame members 54. The seatback frame 50, including the upright frame members 54, may be of any suitable plastic material, e.g., carbon fiber reinforced plastic (CFRP), glass fiber-reinforced semi-finished thermoplastic composite (organosheet), etc. As another example, some or all components of the seatback frame 50 may be formed of a suitable metal, e.g., steel, aluminum, etc.

The covering 52 may include upholstery and padding. The upholstery may be cloth, leather, faux leather, or any other suitable material. The upholstery may be stitched in panels around the frame. The padding may be between the covering 52 and the seatback frame 50 and may be foam or any other suitable material.

The seatback 48 may define an occupant seating area 56. The occupant may be disposed in the occupant seating area 56, as shown in the Figures. The occupant seating area 56 may be on a front side of the seatback 48. The seatback 48 may include an inboard side 58 and an outboard side 60. The inboard side 58 is spaced from the inboard side 58 with the occupant seating area 56 between the inboard side 58 and the outboard side 60.

The vehicle 12 includes doors 62 openable for occupants to enter and exit a passenger cabin 42. The doors 62 may be adjacent the driver seat 44 and the passenger seat 44. The roof rails contact a top edge of the doors 62. Each door 62 includes a door trim (not numbered), the door frame (not numbered), and a door panel (not numbered). The door trim and the door panel are fixed relative to the door frame. The door trim is fixed opposite the door panel relative to the door frame. The door trim is inboard relative to the door frame, and the door panel is outboard relative to the door frame.

The door 62 includes a window 64 opening, an opening completely closed by the window 64 if the window 64 is in a fully raised position. The window 64 opening is defined by the door trim and door panel on a bottom edge and either by the door 62 circumscribing the window 64 opening or by the body, e.g., an A pillar, a B pillar, and a roof rail. The door panel faces outboard relative to the vehicle 12.

The door 62 may be adjacent the seatback 48. Specifically, the door 62 may be adjacent the outboard side 60 of the seatback 48. In the example shown in the figures, the seat 44 is a front seat and the door 62 is a front door. Alternatively, the seat 44 and door 62 may be any other suitable location, e.g., a rear seat and rear door.

With continued reference to FIGS. 1 and 2, the vehicle 12 may include a middle console 66 disposed in the passenger cabin 42. The middle console 66 may be disposed at the front end of the passenger compartment. As shown in FIG. 2, the middle console 66 may be adjacent the seats 44 in the vehicle 12. Specifically, the middle console 66 may be disposed between the driver seat 44 and the passenger seat 44 in the passenger cabin 42. The middle console 66 may be spaced from the doors 62 by the seatbacks 48 of the seats 44, i.e., the middle console 66 may be inboard from the door 62 and the seat 44 of the vehicle 12. The middle console 66 may include storage space for objects inside the vehicle 12, e.g., cupholders, media bins, etc. The middle console 66 may be at any suitable cross-vehicle location, e.g., on a cross-vehicle centerline of the vehicle 12 or offset from the cross-vehicle centerline.

As set forth above, the seat 44 may include the airbag 14 and the second airbag 46. As shown in FIGS. 1 and 2, the airbag 14 may be supported by the inboard side 58 of the seatback 48. The second airbag 46 may be supported by the outboard side 60 of the seatback 48, i.e., opposite of the airbag 14 on the inboard side 58. In other words, the airbag 14 may be adjacent the middle console 66 and the second airbag 46 may be adjacent the nearest door 62.

The airbag 14 and/or the second airbag 46 may be inflatable. In other words, one or both of the airbag 14 and the second airbag 46 may inflate. In examples in which both the airbag 14 and the second airbag 46 inflate, the airbag 14 and the second airbag 46 may simultaneously inflate. Specifically, the occupant seating area 56 may be between the airbag 14 and the second airbag 46 when the airbag 14 and the second airbag 46 are inflated. The second airbag 46 may be between the door 62 and the occupant seating area 56 when the second airbag 46 is in the inflated position. The airbag 14 and the second airbag 46 may each be a side airbag. The second airbag 46 may be a known design.

As shown in FIGS. 3A-3C and 6A-6C, in the event of an impact to the vehicle 12, the second airbag 46 may inflate and begin to deflate as the airbag 14 moved from the uninflated position to the inflated position. As indicated by the arrow, the impact to the vehicle 12 may come from the side of the second airbag 46. As the second airbag 46 absorbs energy from the impact and controls kinematics of the occupant, the inflation restraint 22 temporarily restrains the inflation of the airbag 14. An occupant may move toward the airbag 14 after the impact and the portion of the airbag 14 that is temporarily restrained from inflation inflates to further control the kinematics of the occupant.

The assembly 10 may include an airbag assembly 68 that includes the airbag 14, a housing 70, and an inflator. The airbag assembly 68 may be a side airbag assembly. In such an example, the airbag assembly 68 is supported by the seatback 48 of the seat 44. Specifically, the airbag assembly 68 is supported by the inboard side 58 of the seatback 48. The airbag 14 may extend from the seatback 48 next to the occupant seating area 56 to control occupant kinematics.

With reference to FIGS. 3A-3C and 6A-6C, the airbag 14 includes the first panel 16, the second panel 18, and the inflation chamber 20 between the first panel 16 and the second panel 18. The first panel 16 is on a vehicle-outboard side 60 of the airbag 14, i.e., the first panel 16 may face toward the door 62 nearest the seat 44. The second panel 18 is on a vehicle-inboard side of the airbag 14, i.e., the second panel 18 may face away from the door 62 nearest the seat 44.

When the airbag 14 is in the inflated position, the first panel 16 is spaced from the second panel 18 by the inflation chamber 20. The first panel 16 and the second panel 18 may be directly connected to each other or indirectly connected (i.e., through an intermediate panel) to each other.

In one example, the airbag 14 may include a seam 72 separating the first panel 16 and the second panel 18 of the airbag 14. The seam 72 may extend from the housing 70 along a top, bottom, and vehicle-forward face of the airbag 14. As another example, the first panel 16 and the second panel 18 may be unitary, i.e., one-piece without seams or joints connecting the first panel 16 and the second panel 18. In any event, as set forth above, the first panel 16 faces inboard and the second panel 18 faces outboard.

The airbag 14 may be inflatable between the seatback 48 and the middle console 66. In other words, the airbag 14 may be between the occupant seating area 56 and the middle console 66 in the vehicle 12 when the airbag 14 is in the inflated position. The airbag 14 may abut the middle console 66 in the inflated position.

The airbag 14 includes a head portion 74, a pelvic portion 76, and a thoracic portion 78 between the head portion 74 and the pelvic portion 76. The head portion 74 is at a top of the airbag 14. The pelvic portion 76 is at a bottom of the airbag 14. The thoracic portion 78 is in between the head portion 74 and the pelvic portion 76. Specifically, in the inflated position, the head portion 74 is positioned be adjacent a head of the occupant, the pelvic portion 76 is positioned to be adjacent the pelvis of the occupant, and the thoracic portion 78 is positioned to be adjacent the thorax of the occupant when the occupant is seated in the seat 44 that supports the airbag 14. In these examples, the occupant may be sized between a 5th-percentile female and a 95th-percentile male stature.

The housing 70 is mounted to the seatback 48, e.g., to the upright frame member 54 of the seatback frame 50. For example, the housing 70 may include locating elements, fasteners, etc., that engage the seatback 48 and/or fasteners may engage the housing 70 and the seatback 48 to mount the housing 70 to the seatback 48. The housing 70 may have two shells and a hinge between the shells. When closed, the shells define a cavity that houses the airbag 14.

The inflator (not shown) is in fluid communication with the airbag 14. The inflator expands the airbag 14 with inflation medium, such as a gas, to inflate the airbag 14 from an uninflated position to the inflated position. The inflator may be supported by any suitable component. For example, the inflator may be supported by the housing 70. The inflator may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chamber 20 to deliver inflation medium directly to the inflation chamber 20 or may be connected to the inflation chamber 20 through fill tubes, diffusers, etc.

The airbag assembly 68 includes the inflation restraint 22 exterior to the inflation chamber 20. In other words, the inflation restraint 22 is on the outside of the airbag 14. The inflation restraint 22 temporarily restrains inflation of a portion of the airbag 14 relative to the rest of the airbag 14. In other words, upon initial inflation, the inflation restraint 22 restrains inflation of a portion of the airbag 14. As the airbag 14 continues to inflate, i.e., as more inflation medium expands in the inflation chamber 20, forces created by the inflation overcome the releasable extension 28 and the releasable extension 28 releases to the released position.

This allows the portion that was temporarily restrained to fully inflate. The inflation restraint 22 may control the shape of the airbag 14. For example, the temporary restraint of inflation may lower force applied to an occupant in the event of an impact to the vehicle 12 at the portion of the airbag 14 that is temporarily restrained to inflate.

As shown in the figures, the inflation restraint 22 may be positioned at the thoracic portion 78 of the airbag 14. The inflation restraint 22 temporarily restraints inflation of the thoracic portion 78 of the airbag 14. As other examples, the inflation restraint 22 may be positioned at any portion of the airbag 14 to temporarily restrain inflation of the airbag 14, e.g., at the head portion 74 or the pelvic portion 76 of the airbag 14.

The inflation restraint 22 includes the first end 24 fixed to the first panel 16 and the second end 26 fixed to the second panel 18. In other words, the first end 24 may be fixed to the vehicle-outboard side 60 of the airbag 14 and the second end 26 may be fixed to the vehicle-inboard side of the airbag 14. The first and second ends 24, 26 may be fixed by any suitable manner, e.g., stitching, adhesive, etc., to ensure that the inflation restraint 22 remains attached to the airbag 14 throughout inflation of the airbag 14 to the inflated position.

Figures 5A, 5B:
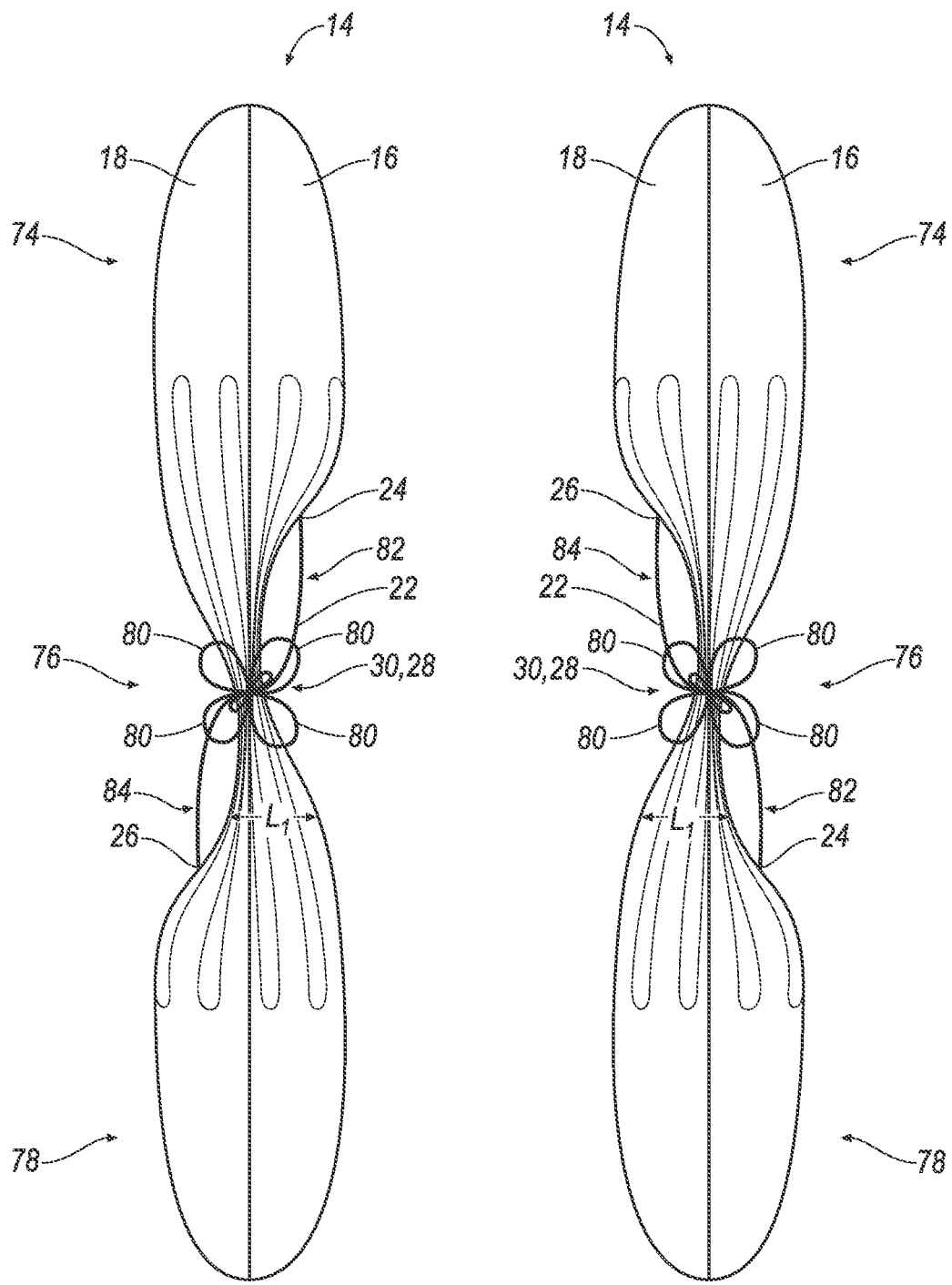
FIG. 5A is a front view of another example of the first embodiment of the airbag having the inflation restraint with the first end fixed to a pelvic portion of the airbag and the second end fixed to a head portion of the airbag.
FIG. 5B is a front view of another example of the first embodiment of the airbag having the inflation restraint with the first end fixed to the head portion of the airbag and the second end fixed to the pelvic portion of the airbag.

The first end 24 and the second end 26 of the inflation restraint 22 may be fixed to different portions of the airbag 14 in different examples. For example, as show in FIG. 3A, the first end 24 and the second end 26 of the restraint may be fixed to the head portion 74 of the airbag 14. In another example, the first and the second end 26 inflation restraint 22 are fixed to the pelvic portion 76 of the airbag 14. In yet another example, as shown in FIG. 5A, the first end 24 may be fixed at the pelvic portion 76 of the airbag 14 while the second end 26 may be fixed to the head portion 74 of the airbag 14. In a final example, as shown in FIG. 5B, the second end 26 may be fixed to the pelvic portion 76 of the airbag 14 while the first end 24 may be fixed to the head portion 74 of the airbag 14.

As set forth above, the inflation restraint 22 includes the releasable extension 28 between the first end 24 and the second end 26. The releasable extension 28 is movable from an unreleased position to a released position as the airbag 14 inflates to the inflated position. When inflation of the airbag 14 is initiated, the releasable extension 28 is in the unreleased position. When the airbag 14 is in the inflated position, the releasable extension 28 is in the released position.

Specifically, the releasable extension 28 is designed to extend when subjected to a tensile force above a predetermined threshold. In other words, the releasable extension 28 does not extend when subjected to a tensile force below the predetermined threshold. During inflation of the airbag 14, the first panel 16 and the second panel 18 move away from each other and generate a tensile force on the inflation restraint 22, and in particular, the releasable extension 28. In other words, the inflation of the airbag 14 pulls the inflation restraint 22 along the length of the inflation restraint 22. During the initial inflation, the tensile force applied to the inflation restraint 22 is below the predetermined threshold at which the releasable extension 28 releases. Accordingly, the inflation restraint 22 restraints inflation of the airbag 14 between the first end 24 and the second end 26. As the airbag 14 continues to inflate, the tensile force applied to the inflation restraint 22 increases above the predetermined threshold and the releasable extension 28 releases allowing the airbag 14 to fully inflate. The releasable extension 28 may release in a binary fashion, i.e., may release all at once when the predetermined threshold is exceeded, or may release in an incremental fashion, e.g., a gradual release initiated when the predetermined threshold is exceeded.

As in the examples shown in the figures, the releasable extension 28 may be positioned at the thoracic portion 78. In such examples, the releasable extension 28 temporarily restrains the inflation of the airbag 14 at the thoracic portion 78 of the airbag 14 when the airbag 14 begins to inflate. When the releasable extension 28 is in the unreleased position, the thoracic portion 78 of the airbag 14 is temporarily restrained from inflation. As the releasable extension 28 moves from the unreleased position to the released position, the thoracic portion 78 of the airbag 14 may begin to inflate to the inflated position. When the releasable extension 28 reaches the released position, the thoracic portion 78 will be in the inflated position.

The inflation restraint 22 may maintain the first end 24 and the second end 26 spaced from each other by a first distance L1 in the unreleased position. When the airbag 14 is in the uninflated position, the inflation restraint 22 maintains the first distance L1. The first distance L1 allows the inflation restraint 22 to temporarily restrain the inflation of the airbag 14 where the inflation restraint 22 is fixed to the airbag 14. As the airbag 14 inflates, the inflation restraint 22 begins to release to the released position.

The first end 24 and the second end 26 are spaced from each other by a second distance L2 greater than the first distance L1 in the released position. As the inflator fills the inflation chamber 20 with an inflatable medium, the releasable extension 28 moves to the released position. The releasable extension 28 allows the distance between the first end 24 and the second end 26 to lengthen as the airbag 14 inflates to the inflated position. The distance between the first end 24 and the second end 26 continues to lengthen until the airbag 14 is in the inflated position and the releasable extension 28 is in the released position.

The inflation restraint 22 may extend continuously from the first end 24 to the second end 26 in the released position. In other words, the inflation restraint 22 is a single piece extending from the first end 24 to the second end 26. The inflation restraint 22 does not break into multiple pieces as the releasable extension 28 releases to the released position. The inflation restraint 22 is not multiple pieces, linked together, that separate in some way when the releasable extension 28 releases to the released position.

As set forth above, in the embodiment shown in FIGS. 3A-5B, the releasable extension 28 may include a releasable knot 30 between the first end 24 and the second end 26. The knot is tied to resist release of the releasable extension 28, i.e., the releasable knot 30 is tied in a way to temporarily restrain the airbag 14 from inflating between the first end 24 and the second end 26. In other words, the releasable knot 30 is designed (i.e., sized, shaped, material type, knot pattern, etc.) to remain tied when subjected to tensile force below the predetermined threshold and to untie when subjected to tensile force above the predetermined threshold. As the airbag 14 inflates to the inflated position and tensile force in the releasable extension 28 exceeds the predetermined threshold, the releasable knot 30 releases to the released position. In other words, the releasable knot 30 is designed so that the releasable knot 30 unties as the airbag 14 moves from the uninflated position to the inflated position. As the releasable knot 30 unties, the inflation restraint 22 lengthens from the first distance L1 to the second distance L2.

Figure 4:
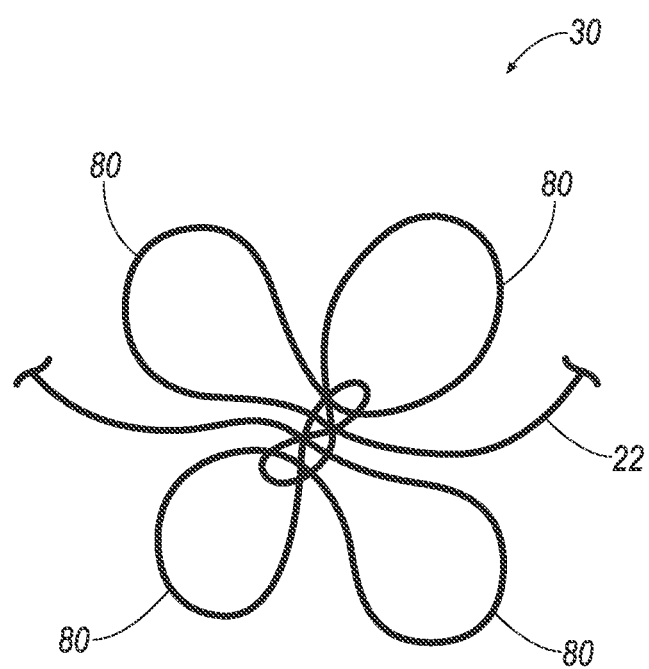
FIG. 4 is a magnified view of the releasable knot in the unrelease position.

The releasable knot 30 may include a loop 80 used to gather material of the inflation restraint 22 to maintain the first distance L1 between the first end 24 and the second end 26 of the inflation restraint 22 in the unreleased position. As in the example shown in FIGS. 3A-3C, 4, and 5A-5B, the releasable knot 30 may have multiple loops 80, e.g., four loops 80 as shown in FIG. 4. As the airbag 14 inflates to the inflated position and as the releasable knot 30 moves to the released position, the loops 80 will be released, and the inflation restraint 22 will lengthen to the second distance L2. In other words, the material gathered into the loops 80 will extend to the released position.

The inflation restraint 22 includes a first elongated portion 82 extending from the releasable knot 30 to the first end 24 and a second elongated portion 84 extending from the releasable knot 30 to the second end 26. In other words, the releasable knot 30 may be between the first elongated portion 82 and the second elongated portion 84. The first elongated portion 82 may extend from the releasable knot 30 to the first panel 16 of the airbag 14 and the second elongated portion 84 may extend from the releasable knot 30 to the second panel 18 of the airbag 14, e.g., excess material that is not a loop 80 in the releasable knot 30 extends from the releasable knot 30 to the first and second ends 24, 26 and the first and second panels 18.

The first elongated portion 82 is unattached to the airbag 14 from the releasable knot 30 to the first end 24 and the second elongated portion 84 is unattached from the airbag 14 from the releasable knot 30 to the second end 26. In other words, the first elongated portion 82 and the second elongated portion 84 are free from the airbag 14, i.e., the first elongated portion 82 and the second elongate portion are only attached to the airbag 14 at the first end 24 and second end 26 respectively. There are no other parts of the inflation restraint 22 which attach to the airbag 14 other than the first end 24 and the second end 26. There may be space between airbag 14 and the first and second elongated portions 82, 84. Lengths of the first and second elongated portions 82, 84 may be tuned depending on the size of the airbag 14 and inflation chamber 20.

The releasable knot 30 may be unattached from the airbag 14. In other words, the releasable knot 30 is free from the airbag 14, i.e., the inflation restraint 22 is not fixed to the airbag 14 anywhere other than by the first end 24 and the second end 26.

The inflation restraint 22 of FIGS. 3A-5B, may be unitary, i.e., one piece free of joints, seams, etc., between the first end 24 and the second end 26. The inflation restraint 22 of FIGS. 3A-5B may be fabric (e.g., woven polymer such as nylon, a yarn, etc.) or may be solid (e.g., a thin plastic sheet, string, etc.).

As set forth above, in the embodiment shown in FIGS. 6A-9, the releasable extension 28 includes may include a tear strip 32. The tear strip 32 includes a first strip 34 extending from the first end 24 and a second strip 36 extending from the second end 26, i.e., the first strip 34 may be fixed to the first panel 16 of the airbag 14 and the second strip 36 may be fixed to the second panel 18 of the airbag 14.

The first strip 34 may include a slot 86 extending away from the first end 24 of the inflation restraint 22. The slot 86 may be generally rectangular with a pair of long sides extending parallel to one another and a pair of short sides extending parallel to one another. The second strip 36 may fit into the slot 86.

The releasable extension 28 may include a row of lands 38 and perforations 40 in alternating relationship between the first strip 34 and the second strip 36. The row of lands 38 and perforations 40 may be in the slot 86 between the first strip 34 and the second strip 36. The row may extend linearly along one of the long sides of the slot 86 with the lands 38 and perforations 40 being between the long side and the second strip 36. The releasable extension 28 may include a second row of lands 38 and perforations 40 in alternating relationship between the first strip 34 and the second strip 36 along the other of the long sides of the slot 86. The second row may extend linearly along the second of the long sides of the slot 86 with the lands 38 and perforations 40 being between the long side and the second strip 36. The row and second row of lands 38 and perforations 40 may extend parallel to one another between the first strip 34 and the second strip 36.

The lands 38, in both the first row and the second row, may be frangible relative to the first strip 34 and/or second strip 36. In other words, the lands 38 break relative to the first strip 34 and/or the second strip 36. In the unreleased position, the lands 38 remain intact between the first strip 34 and the second strip 36. As the airbag 14 inflates to the inflated position and the releasable extension 28 moves to the released position, the first end 24 of the inflation restraint 22 on the first strip 34 moves away from the second end 26 of the inflation restraint 22 on the second strip 36. As the airbag 14 inflates, the lands 38 may break between the first strip 34 and the second strip 36 allowing the inflation restraint 22 to release to the released position. In other words, the lands 38 are designed (i.e., sized, shaped, material type, length, width, thickness, etc.) to remain intact when the first and second strips 34, 36 are subjected to tensile force below the predetermined threshold and to break when the first and second strips 34, 36 are subjected to tensile force above the predetermined threshold. As the lands 38 break, the portion of the airbag 14 that is temporarily restrained from inflation begins to fully inflate.

The assembly 10 may include more than one inflation restraint 22. As an example, the assembly 10 of FIGS. 6A-C include two inflation restraints 22. Similarly, the assembly 10 of FIGS. 3A-C may include more than one inflation restraint 22.

Figure 6A:
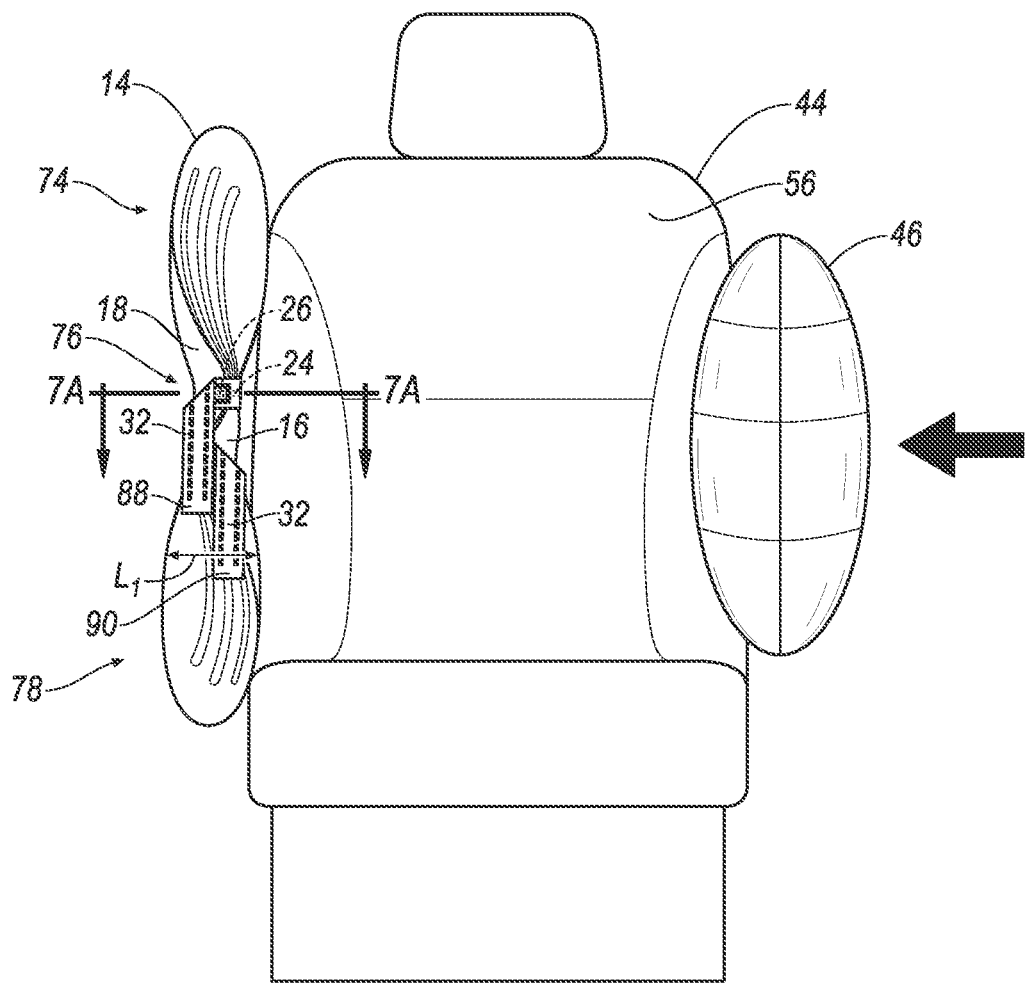
FIG. 6A is a front view of a second embodiment of the airbag having two inflation restraints each including a tear strip in an unreleased position.
Figure 6B:
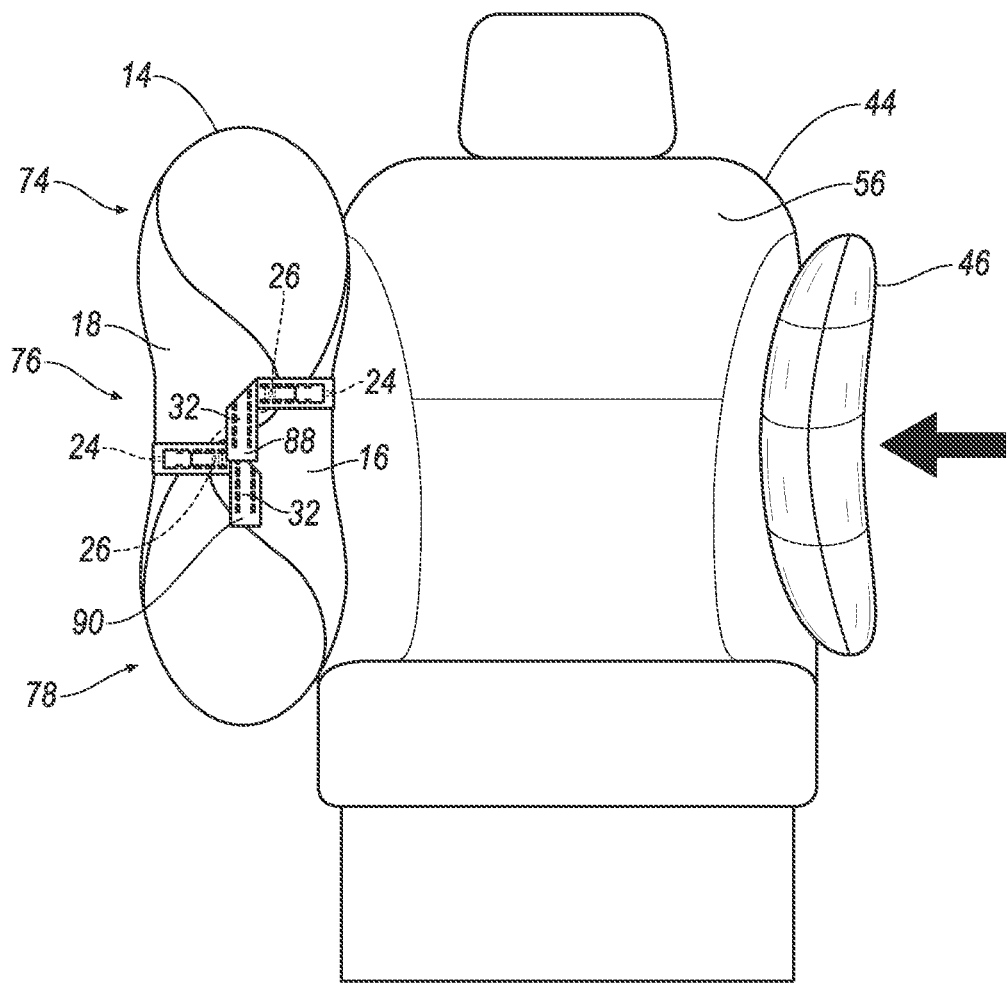
FIG. 6B is a front view of the second embodiment of the airbag having two inflation restraints including the tear strip moving from the unreleased position toward a released position during inflation of the airbag.
Figure 6C:
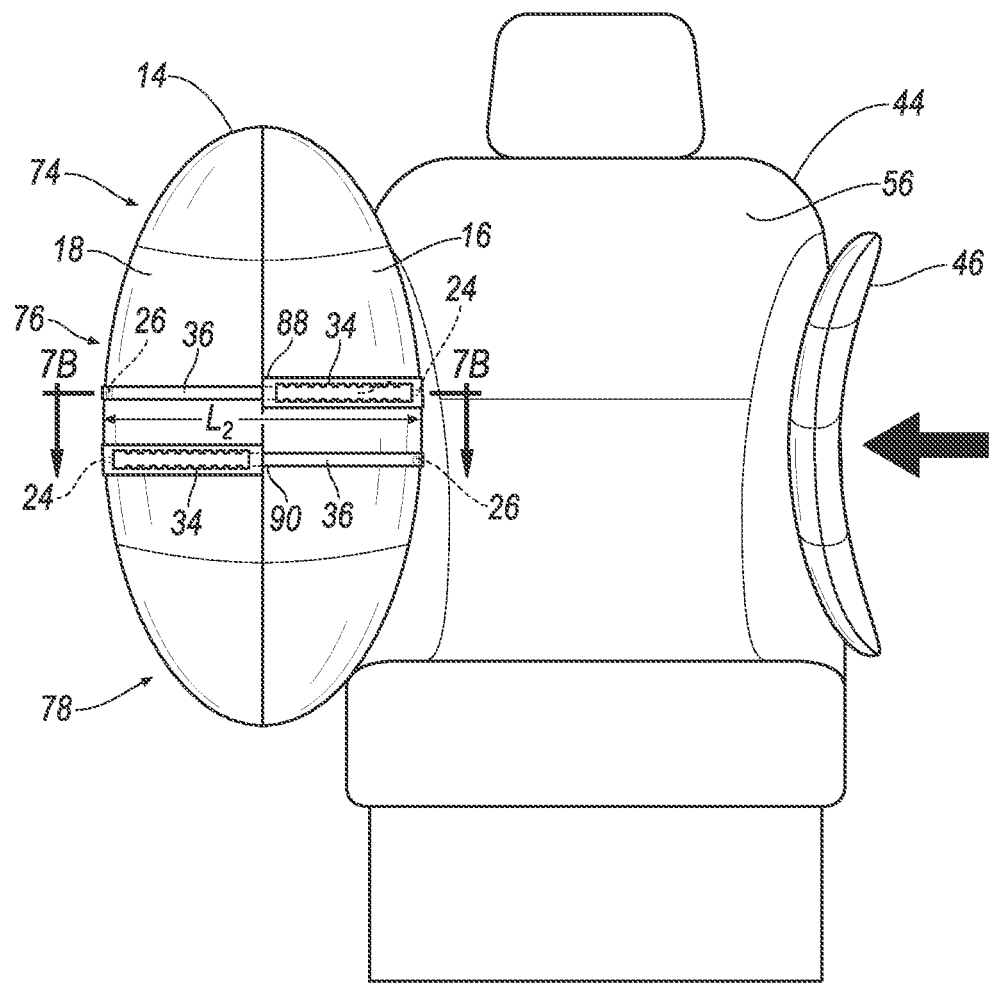
FIG. 6C is a front view of the second embodiment of the airbag in an inflated position after release of the tear strips to the released position.
Figure 7:
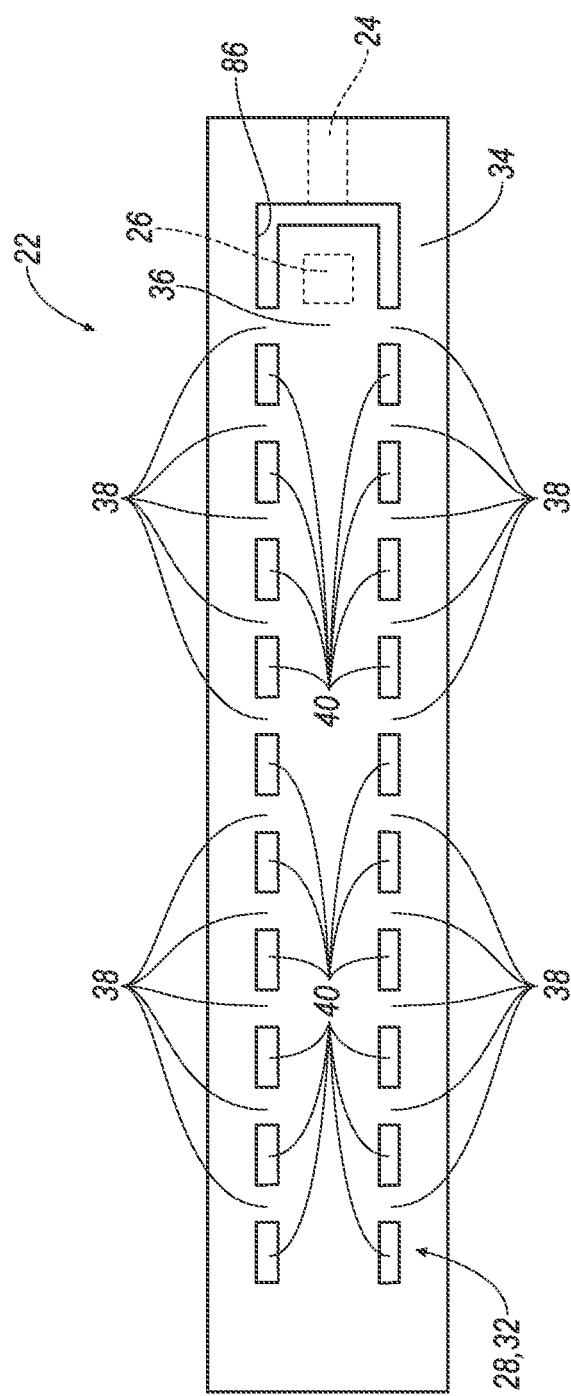
FIG. 7 is a plan view of one of the tear strips of the second embodiment.
Figure 8B:
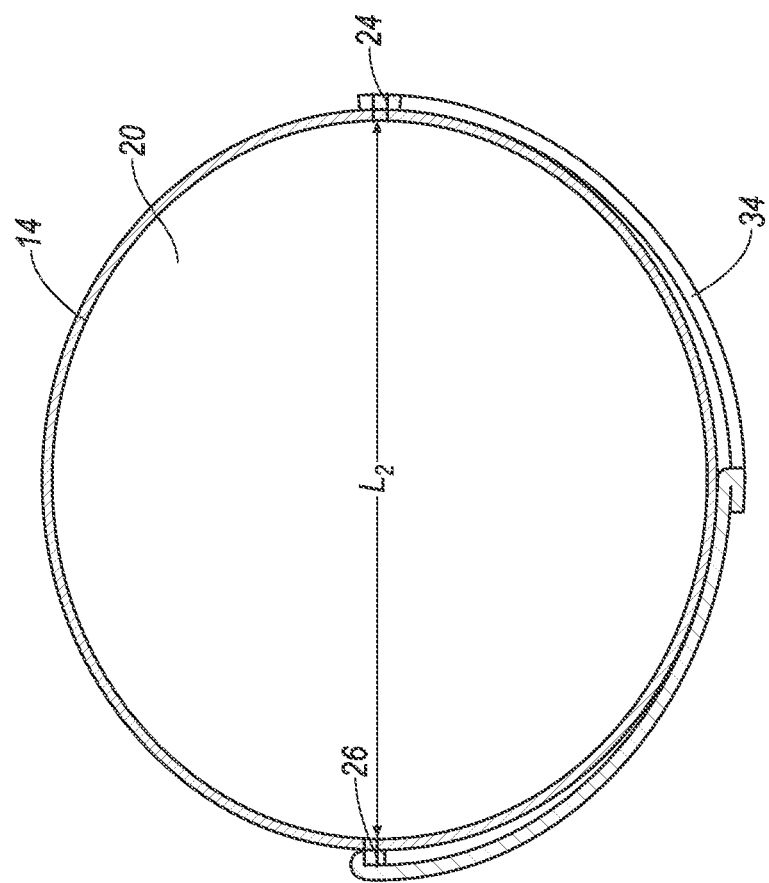
FIG. 8B is a cross-sectional view of the second embodiment shown in FIG. 6C.
Figure 8A:
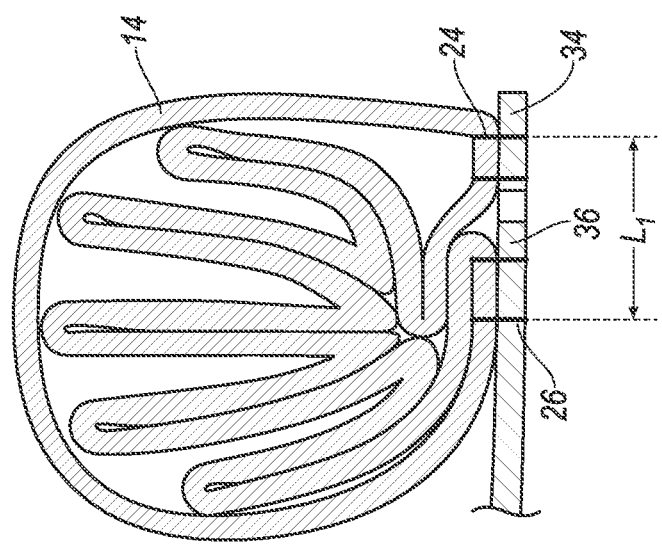
FIG. 8A is a cross-sectional view of the second embodiment shown in FIG. 6A.
Figure 9:
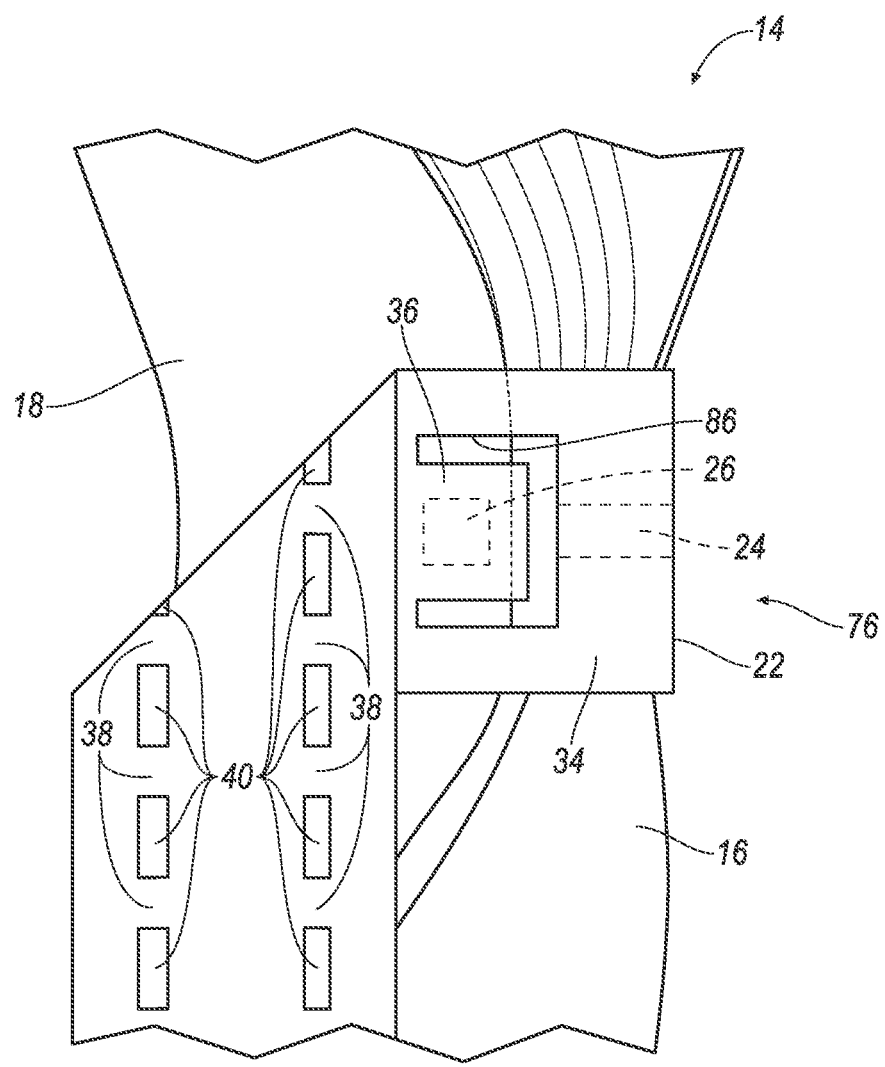
FIG. 9 is a magnified view of a portion of FIG. 6A.

In the example shown in FIGS. 6A-C, the assembly 10 includes a first inflation restraint 88 and a second inflation restraint 90. The second inflation restraint 90 is releasable in a direction opposite of the first inflation restraint 88. The first inflation restraint 88 and the second inflation restraint 90 may be similar or identical to each other. Common numerals are used to identify common features of the first inflation restraint 88 and the second inflation restraint 90. The second inflation restraint 90 may include a first end 24 and a second end 26 fixed to opposite panels of the airbag 14 of the first inflation restraint 88, i.e., the first end 24 of the first inflation restraint 88 may be fixed to the first panel 16 with the first end 24 of the second inflation restraint 90 being fixed to the second panel 18 and the second end 26 of the inflation restraint may be fixed to the second panel 18 with the second end 26 of the second inflation restraint 90 being fixed to the first panel 16. The lands 38 of the inflation restraints each break between the first strips 34 and the second strips 36 at the same rate relative to each other.

The inflation restraint 22 of FIGS. 4A-9, may be unitary, i.e., one piece free of joints, seams, etc. The inflation restraint 22 of FIGS. 4A-9 may be fabric (e.g., woven polymer such as nylon, a yarn, etc.) or may be solid (e.g., a thin plastic sheet, string, etc.).

The vehicle 12 may include at least one impact sensor for sensing impact of the vehicle 12, and a computer in communication with the impact sensor and the inflators. The computer may activate the inflators, e.g., provide an impulse to a pyrotechnic charge of the inflators when the impact sensor senses an impact of the vehicle 12. Alternatively, or additionally to sensing impact, the impact sensor may be configured to sense impact prior to impact, i.e., pre-impact sensing. The impact sensor may be in communication with the computer. The impact sensor is configured to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 12.

The communication network can include a bus in the vehicle 12 such as a controller area network (CAN) or the like, and/or other wired and/or wireless mechanisms. Via the vehicle network, the computer may transmit messages to various devices in the vehicle 12 and/or receive messages (e.g., CAN messages) from the various devices, e.g., sensors, an actuator, a human machine interface (HMI), etc. Alternatively, or additionally, in cases where the computer actually comprises a plurality of devices, the vehicle communication network may be used for communications between devices represented as the computer in this disclosure. Further, as mentioned below, various controllers and/or sensors may provide data to the computer via the vehicle 12 communication network.

The computer includes a processor and a memory such as are known. The memory includes one or more forms of computer readable media, and stores instructions executable by the computer for performing various operations, including as disclosed herein. The computer may include programming to operate one or more of vehicle brakes, propulsion (e.g., control of acceleration in the vehicle 12 by controlling one or more of an internal combustion engine, electric motor, hybrid engine, etc.), Steering, climate control, interior and/or exterior lights, etc., as well as to determine whether and when the computer, as opposed to a human operator, is to control such operations. Additionally, the computer may be programmed to determine whether and when a human operator is to control such operations. The computer may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle components, e.g., a powertrain controller, a brake controller, a steering controller, etc. The computer is generally arranged for communications on a vehicle 12 communication network that can include a bus in the vehicle 12 such as a controller area network (CAN) or the like, and/or other wired and/or wireless mechanisms. Via the vehicle network, the computer may transmit messages to various devices in the vehicle 12 and/or receive messages (e.g., CAN messages) from the various devices, e.g., sensors, an actuator, a human machine interface (HMI), etc. Alternatively, or additionally, in cases where the computer actually comprises a plurality of devices, the vehicle communication network may be used for communications between devices represented as the computer in this disclosure. Further, as mentioned below, various controllers and/or sensors may provide data to the computer via the vehicle communication network.

In the event of an impact, the impact sensors may detect the impact and transmit a signal through the communications network to the computer. The computer may transmit a signal through the communications network to the inflator. The inflator may discharge and inflate the airbag 14 to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
an airbag inflatable to an inflated position, the airbag having a first panel facing a first direction, a second panel facing a second direction different than the first direction of the first panel, and an inflation chamber between the first panel and the second panel;
an inflation restraint exterior to the inflation chamber, the inflation restraint having a first end fixed to the first panel at a first portion of the first panel that faces in the first direction and a second end fixed to the second panel at a second portion of the second panel that faces in the second direction;
the inflation restraint including a releasable extension between the first end and the second end, the releasable extension is movable from an unreleased position to a released position as the airbag inflates to the inflated position; and
the airbag having a third portion between the first portion and the second portion, the inflation restraint restraining inflation of the third portion of the airbag relative to the first portion and the second portion of the airbag in the unreleased position and releasing the third portion of the airbag relative to the first portion and the second portion of the airbag to inflate in the released position.

2. The assembly of claim 1, wherein the inflation restraint maintains the first end and the second end spaced from each other by a first distance in the unreleased position and the first end and the second end are spaced from each other a second distance greater than the first distance in the released position.

3. The assembly of claim 2, wherein the releasable extension includes a releasable knot between the first end and the second end.

4. The assembly of claim 3, wherein the inflation restraint extends continuously from the first end to the second end in the released position.

5. The assembly of claim 3, wherein the inflation restraint includes a first elongated portion extending from the releasable knot to the first end and a second elongated portion extending from the releasable knot to the second end.

6. The assembly of claim 5, wherein the first elongated portion is unattached to the airbag from the releasable knot to the first end and the second elongated portion is unattached from the airbag from the releasable knot to the second end.

7. The assembly of claim 6, wherein the releasable knot is unattached from the airbag.

8. The assembly of claim 3, wherein the releasable knot is unattached from the airbag.

9. The assembly of claim 3, wherein the releasable knot includes a loop.

10. The assembly of claim 1, wherein the releasable extension includes a first strip extending from the first end, a second strip extending from the second end, and a row of lands and perforations in alternating relationship between the first strip and the second strip, the lands being frangible relative to the first strip and/or second strip.

11. The assembly of claim 1, further comprising a second inflation restraint being releasable in a direction opposite of the inflation restraint.

12. The assembly of claim 11, wherein the inflation restraint and the second inflation restraint each include a first strip, a second strip, and a row of lands and perforations in alternating relationship between the first strip and the second strip, the lands being frangible relative to the first strip and/or second strip.

13. The assembly of claim 1, wherein the airbag includes a head portion and a pelvic portion, the third portion being a thoracic portion between the head portion and the pelvic portion, the releasable extension being positioned at the thoracic portion in the unreleased position, and the head portion and the pelvic portion are unrestrained by the releasable extension when the releasable extension is in the unreleased position.

14. An assembly comprising:
a seatback;
an airbag inflatable to an inflated position and supported by the seatback, the airbag having a first panel facing a first direction, a second panel facing a second direction different than the first direction of the first panel, and an inflation chamber between the first panel and the second panel;
an inflation restraint exterior to the inflation chamber, the inflation restraint having a first end fixed to the first panel at a portion of the first panel that faces in the first direction and a second end fixed to the second panel at a portion of the second panel that faces in the second direction;
the inflation restraint including a releasable extension between the first end and the second end, the releasable extension is movable from an unreleased position to a released position as the airbag inflates to the inflated position; and
the airbag including an upper portion, a lower portion, and a middle portion between the upper portion and the lower portion, the inflation restraint restraining inflation of the middle portion in the unreleased position and the inflation of the upper and lower portions being unrestrained by the inflation restraint in the unreleased position.

15. The assembly of claim 14, wherein the releasable extension maintains the first end and the second end spaced from each other by a first distance in the unreleased position and the first end and the second end are spaced from each other a second distance greater than the first distance in the released position.

16. The assembly of claim 15, wherein the releasable extension includes a releasable knot between the first end and the second end.

17. The assembly of claim 14, wherein the releasable extension includes a first strip extending from the first end, a second strip extending from the second end, and a row of lands and perforations in alternating relationship between the first strip and the second strip, the lands being frangible relative to the first strip and second strip.

18. The assembly of claim 14, wherein the seatback includes an inboard side and outboard side spaced from the inboard side, the airbag supported by the inboard side of the seatback.

19. The assembly of claim 18, further comprising a second airbag supported by the outboard side of the seatback.

20. The assembly of claim 14, further comprising a middle console, the airbag being inflatable between the seatback and the middle console.

\* \* \* \* \*